US012652220B2

(12) United States Patent (10) Patent No.: US 12,652,220 B2

Yamasaki et al. (45) Date of Patent: Jun. 9, 2026

(54) COMMUNICATION CONTROL DEVICE, VEHICLE, COMMUNICATION CONTROL METHOD, AND COMMUNICATION CONTROL PROGRAM

(71) Applicants: TOYOTA JIDOSHA KABUSHIKI KAISHA, Toyota (JP); SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Yasuhiro Yamasaki, Nishin (JP); Kunihiro Miyauchi, Toyota (JP); Hideki Goto, Okazaki (JP); Ikuyoshi Otake, Toyota (JP); Yoshio Ito, Osaka (JP); Yusuke Yamamoto, Osaka (JP); Tatsuya Izumi, Osaka (JP); Hideyuki Tanaka, Osaka (JP); Kenta Ogata, Osaka (JP); Darmawan Go, Yokkaichi (JP); Yoshitaka Kikuchi, Yokkaichi (JP); Hirofumi Urayama, Yokkaichi (JP)

(73) Assignees: TOYOTA JIDOSHA KABUSHIKI KAISHA, Toyota (JP); SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 18/730,468

(22) PCT Filed: Jan. 5, 2023

(86) PCT No.: PCT/JP2023/000100
§ 371 (c)(1),
(2) Date: Jul. 19, 2024

(87) PCT Pub. No.: WO2023/140116
PCT Pub. Date: Jul. 27, 2023

(65) Prior Publication Data
US 2025/0132979 A1 Apr. 24, 2025

(30) Foreign Application Priority Data
Jan. 24, 2022 (JP) ................................. 2022-008999

(51) Int. Cl.
*H04L 45/745* (2022.01)
*H04L 12/26* (2006.01)
(Continued)

(52) U.S. Cl.
CPC ...... *H04L 41/0866* (2013.01); *H04L 41/0816* (2013.01); *H04L 45/42* (2013.01); *H04L 67/12* (2013.01)

(58) Field of Classification Search
CPC . H04L 41/0866; H04L 41/0816; H04L 45/42; H04L 67/12; H04L 45/745;
(Continued)

(56) References Cited

U.S. PATENT DOCUMENTS 11,075,803 B1 7/2021 Kapadia et al.
2015/0015376 A1* 1/2015 Jenkins ................. G08C 17/02
340/12.5
(Continued)

FOREIGN PATENT DOCUMENTS

JP 2017-169044 A 9/2017
JP 2018-152842 A 9/2018
(Continued)

OTHER PUBLICATIONS

International Search Report & Written Opinion issued Mar. 20, 2023 in PCT/JP2023/000100, filed on Jan. 5, 2023, 7 pages.
(Continued)

*Primary Examiner* — Jude Jean Gilles
(74) *Attorney, Agent, or Firm* — Oblon, McClelland, Maier & Neustadt, L.L.P.

(57) ABSTRACT

A central ECU serving as a communication control device includes a reception unit that receives a change notification
(Continued)

related to a change in a communication setting of an in-vehicle network, a determination unit that determines whether or not an Ethernet switch connected to the communication control device is operable according to new settings information needed to accompany the change notification, and an inquiry unit that prompts a user to indicate whether or not to reflect the settings information in the Ethernet switch in cases in which the Ethernet switch has been determined to be operable according to the settings information.

9 Claims, 13 Drawing Sheets

(51) Int. Cl.

| | |
|---|---|
| *H04L 12/741* | (2013.01) |
| *H04L 12/931* | (2013.01) |
| *H04L 41/0816* | (2022.01) |
| *H04L 41/0866* | (2022.01) |
| *H04L 45/42* | (2022.01) |
| *G06F 17/30* | (2006.01) |
| *H04L 67/12* | (2022.01) |

(58) Field of Classification Search
CPC ..... H04L 12/741; H04L 12/931; H04L 12/26; G06F 17/30

USPC ........................................................ 709/224
See application file for complete search history.

(56) References Cited

U.S. PATENT DOCUMENTS

| | | | |
|---|---|---|---|
| 2016/0078583 A1* | 3/2016 | Nishitani | G06T 1/0014 |
| | | | 348/207.1 |
| 2016/0266886 A1 | 9/2016 | Sarkar et al. | |
| 2019/0140778 A1 | 5/2019 | Kishikawa et al. | |
| 2019/0210545 A1* | 7/2019 | Sangameswaran | B60R 16/033 |
| 2021/0400452 A1 | 12/2021 | Baba et al. | |
| 2022/0148344 A1 | 5/2022 | Teraoka et al. | |

FOREIGN PATENT DOCUMENTS

| | | |
|---|---|---|
| JP | 2020-166583 A | 10/2020 |
| WO | WO 2020/145334 A1 | 7/2020 |

OTHER PUBLICATIONS

Haeberle, Marco, et al., Sofwarization of Automotive E/E Architectures: A Software-Defined Networking Approach, 2020 IEEE Vehicular Networking Conference VNC), Dec. 16, 2020, 8 pages.

* cited by examiner

FIG.3

COMMUNICATION CONTROL DEVICE, VEHICLE, COMMUNICATION CONTROL METHOD, AND COMMUNICATION CONTROL PROGRAM

TECHNICAL FIELD

The present disclosure relates to a communication control device to control communication of a network, and a vehicle, a communication control method, and a communication control program of the same.

BACKGROUND ART

Software defined networking (SDN) technology disclosed in Japanese Patent Application Laid-Open (JP-A) No. 2017-169044 enables communication settings in a network (hereafter referred to as "network settings") to be changed. An SDN network includes an SDN controller and plural SDN switches, and the SDN switches perform network control by the SDN controller distributing network settings to the SDN switches.

SUMMARY OF INVENTION

Technical Problem

In conventional technology there is a problem regarding a drop in user convenience in cases in which, after a user has permitted activation of software using a distribution package (OTA) and changes of an external system such as adding an ECU by plug-and-play or the like, a situation is actualized in which SDN switches are unable to operate according to the new network settings needed accompanying the above changes.

In consideration of the above circumstances, an object of the present disclosure is to provide a communication control device that, in cases in which communication settings of a network have been changed in a user-unaware state, enables a situation in which a switching control unit is unable to operate according to the new network settings to be ex post facto suppressed from being actualized, and to a vehicle, a communication control method, and a communication control program of the same.

Solution to Problem

A communication control device of a first aspect is a communication control device that controls communication of a network. The communication control device includes a reception unit that receives a change notification related to a change in a communication setting of the network, a determination unit that determines whether or not a switching control unit connected to the communication control device is operable according to new settings information of the network needed to accompany the change notification, and an inquiry unit that prompts a user to indicate whether or not to reflect the new settings information in the switching control unit in cases in which the switching control unit has been determined to be operable according to the settings information.

The communication control device of the first aspect is a communication control device that controls communication of a network, with the reception unit therein receiving a change notification related to a change in a communication setting of the network, the determination unit determining whether or not a switching control unit connected to the communication control device is operable according to new settings information of the network needed to accompany the change notification, and the inquiry unit prompting a user to indicate whether or not to reflect the new settings information in the switching control unit in cases in which the switching control unit has been determined to be operable according to the settings information. This means that the communication control device, in cases in which communication settings of a network have been changed in a user-unaware state, enables a situation in which a switching control unit is unable to operate according to the new network settings to be ex post facto suppressed from being actualized.

A communication control device of a second aspect is the communication control device of the first aspect, further including a notification unit that, in cases in which the determination unit has determined that the switching control unit is inoperable according to the new settings information, notifies the user both that the switching control unit is inoperable according to the new settings information and of a cause of being inoperable.

In the communication control device of the second aspect a user is able to ascertain both that a switching control unit is inoperable according to the settings information and the cause of being inoperable.

A communication control device of a third aspect is the communication control device of the first aspect or the second aspect, further including a request unit that, in cases in which the determination unit has determined that the switching control unit is inoperable according to the settings information, requests settings information that would make the switching control unit operable from an external device external to the network.

In the communication control device of the third aspect, even if the switching control unit is inoperable according to the settings information, settings information that would make the switching control unit operable can be acquired.

A communication control device of a fourth aspect is the communication control device of any one aspect of the first to the third aspect, wherein the reception unit receives the change notification together with an update of software for execution in a control device on the network.

The communication control device of the fourth aspect enables the change notification to be received together with the update of software.

A communication control device of a fifth aspect is the communication control device of any one aspect of the first to the fourth aspect, wherein the reception unit receives the change notification in cases in which a new control device has been connected to the network.

The communication control device of the fifth aspect enables the change notification to be received in cases in which a new control device has been connected to the network.

A communication control device of a sixth aspect is the communication control device of any one aspect of the first to the third aspect, wherein the reception unit receives the change notification in cases in which the network has been subjected to an external attack and a failsafe state has been adopted.

The communication control device of the sixth aspect enables the change notification to be received in cases in which the network has been subjected to an external attack.

A vehicle of a seventh aspect includes the communication control device of any one aspect of the first to the sixth aspect, at least one switching control unit, and a control device connected to the switching control unit.

The vehicle of the seventh aspect, in cases in which communication settings of a network have been changed in a user-unaware state, enables a situation in which a switching control unit is unable to operate according to the new network settings to be ex post facto suppressed from being actualized, and enables safe vehicle travel to be secured.

A communication control method of an eighth aspect is a communication control method that controls communication of a network and is processing executed by a computer. The processing includes receiving a change notification related to a change in a communication setting of the network, determining whether or not a switching control unit connected to the communication control device is operable according to new settings information of the network needed to accompany the change notification, and prompting a user to indicate whether or not to reflect the new settings information in the switching control unit in cases in which the switching control unit has been determined to be operable according to the settings information.

The communication control method of the eighth aspect is the communication control method that controls communication of a network, and a computer receives change notification related to a change to a communication setting of the network. In the communication control method whether or not the switching control unit connected to the communication control device is operable according to new settings information of the network needed accompany the change notification is determined. Moreover, in the communication control method, the user is prompted to indicate whether or not to reflect the new settings information in the switching control unit in cases in which the switching control unit has been determined to be operable according to the settings information. This means that the communication control method, in cases in which communication settings of a network have been changed in a user-unaware state, enables a situation in which a switching control unit is unable to operate according to the new network settings to be ex post facto suppressed from being actualized.

A communication control program of a ninth aspect, is a communication control program that controls communication of a network and causes processing to be executed by a computer. The processing includes receiving a change notification related to a change in a communication setting of the network, determining whether or not a switching control unit connected to its own device is operable according to new settings information of the network needed to accompany the change notification, and prompting a user to indicate whether or not to reflect the new settings information in the switching control unit in cases in which the switching control unit has been determined to be operable according to the settings information.

The communication control program of the ninth aspect is the communication control program that controls communication of a network, and causes a computer to execute the following processing. Namely, the computer executes processing to receive a change notification related to a change to a communication setting of the network. The computer also determines whether or not a switching control unit connected to its own device is operable according to new settings information of the network needed to accompany the change notification. The computer also prompts a user to indicate whether or not to reflect the new settings information in the switching control unit in cases in which the switching control unit has been determined to be operable according to the settings information. This accordingly means that this program, in cases in which communication settings of a network have been changed in a user-unaware state, enables a situation in which a switching control unit is unable to operate according to the new network settings to be ex post facto suppressed from being actualized.

Advantageous Effects of Invention

The present disclosure, in cases in which communication settings of a network have been changed in a user-unaware state, enables a situation in which a switching control unit is unable to operate according to the new network settings to be ex post facto suppressed from being actualized.

BRIEF DESCRIPTION OF DRAWINGS

FIG. 3 is a block diagram illustrating a functional structure of a communication control system of the first exemplary embodiment.

DESCRIPTION OF EMBODIMENTS

Description follows regarding a communication control system including a communication control device of the present disclosure. Communication control systems are systems that perform communication in a vehicle, and are compatible with software defined networking (SDN) and configured so as to be able to acquire setting information related to settings for communication from a server outside the vehicle as needed.

First Exemplary Embodiment

—Overall Structure—

Figure 1:
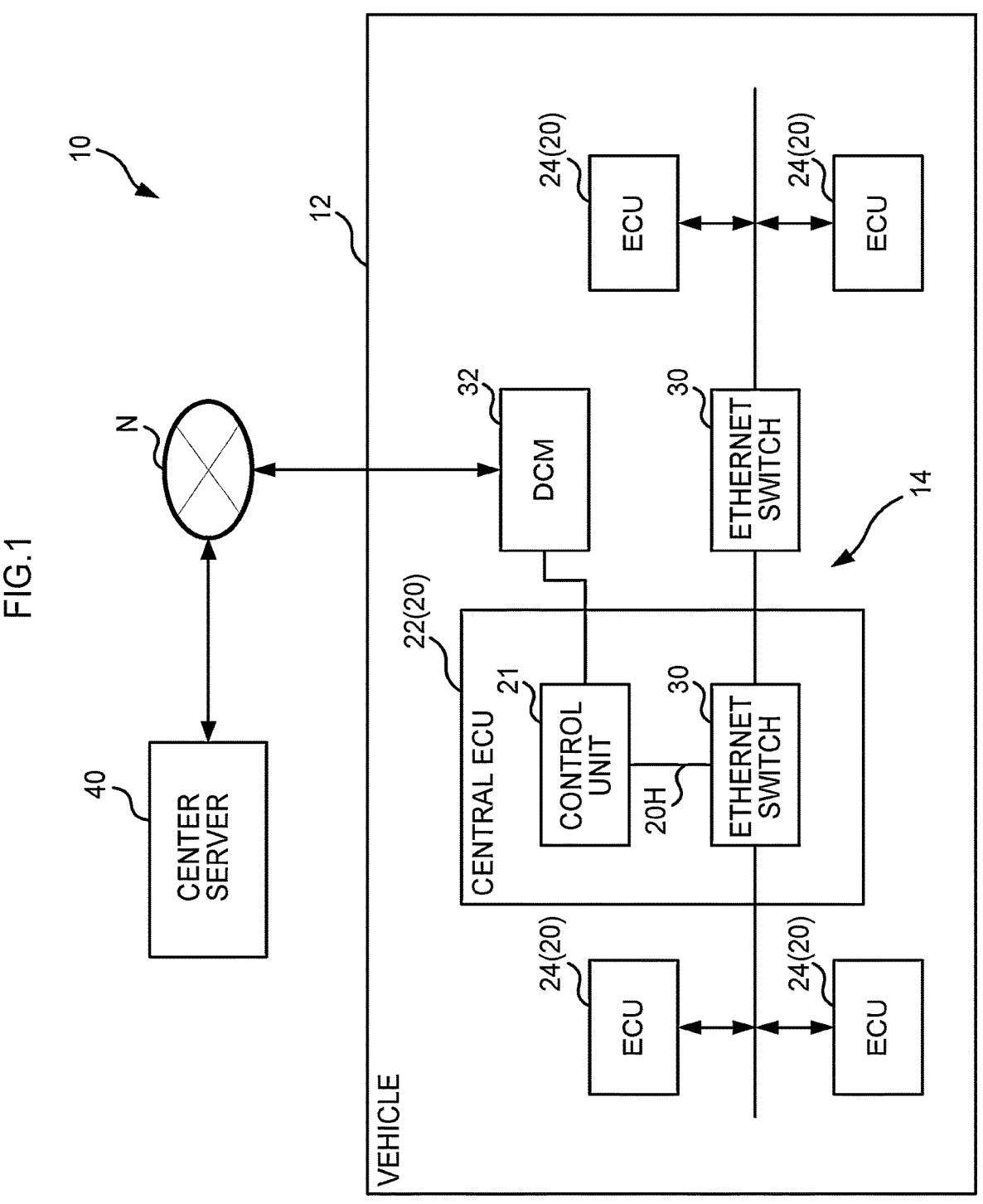
FIG. 1 is a diagram illustrating a schematic structure of a communication control system according to a first exemplary embodiment.

As illustrated in FIG. 1, a communication control system 10 of a first exemplary embodiment is configured including a vehicle 12, and a center server 40 serving as an external device. The center server 40 is installed in a facility of the manufacturer of the vehicle 12 or the like for performing management and operation of the communication control system 10. The vehicle 12 and the center server 40 are connected together over a public network N.

—Vehicle—

There is an in-vehicle network 14 in the vehicle 12 of the present exemplary embodiment configured including plural ECUs 20, plural Ethernet switches 30, and a data communication module (DCM) 32. The in-vehicle network 14 is an example of a network. The ECUs 20 include a central ECU 22 for integration control of the vehicle 12, and an ECU 24 having communication controlled by the central ECU 22. Examples of the ECU 24 include an advance driver assistance system (ADAS)-ECU, a steering ECU, a body ECU, and an information system ECU. The ECU 24 is an example of a control device.

Figure 2:
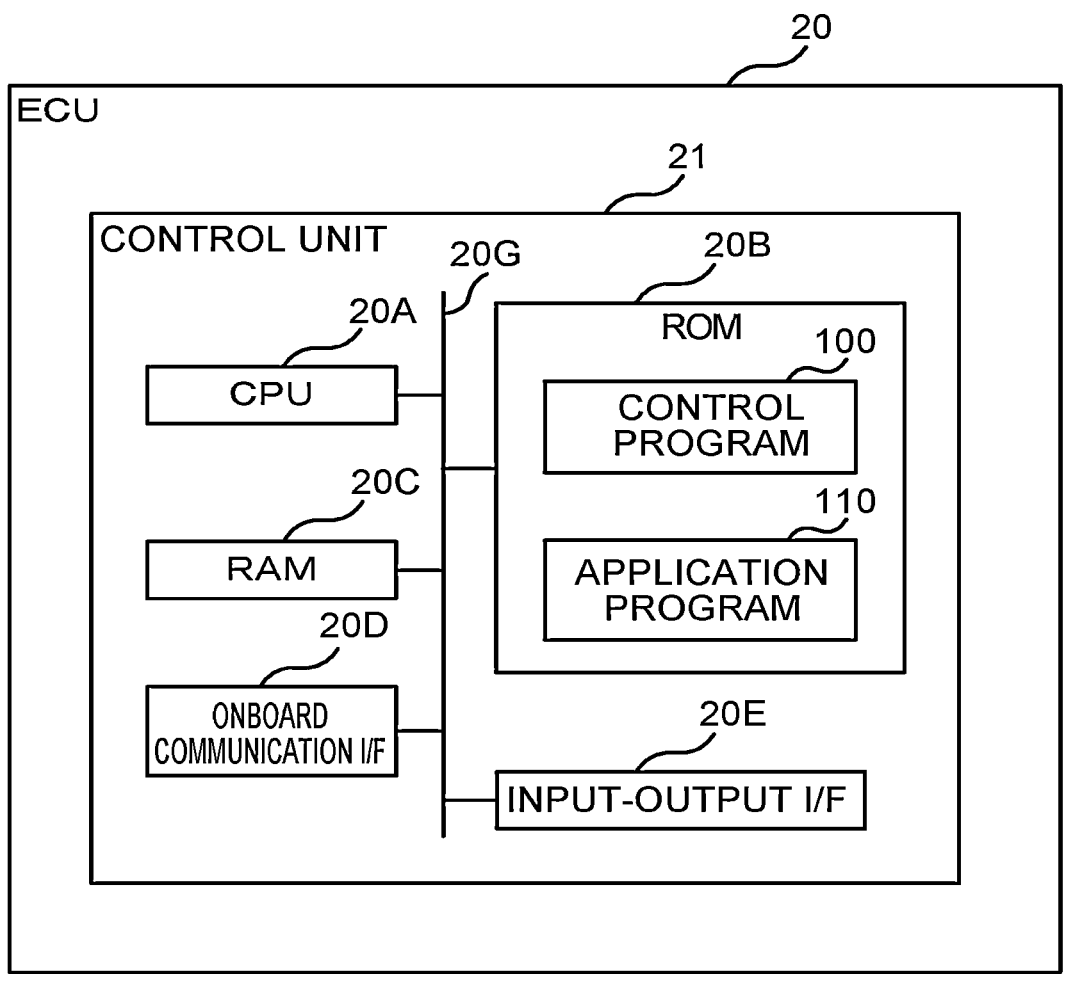
FIG. 2 is a block diagram illustrating a hardware structure of an ECU in a vehicle of the first exemplary embodiment.

As illustrated in FIG. 2, the ECUs 20 each include at least a control unit 21 that functions as an SDN controller, and as needed is configured including an Ethernet switch 30. The control unit 21 is configured including a central processing unit (CPU) 20A, read only memory (ROM) 20B, random access memory (RAM) 20C, an onboard communication interface (I/F) 20D, and an input-output I/F 20E. The CPU 20A, the ROM 20B, the RAM 20C, the onboard communication I/F 20D, and the input-output I/F 20E are connected together through an internal bus 20G so as to be able to communicate with each other.

The CPU 20A is a central processing unit that executes various programs and controls each unit. Namely, the CPU 20A reads a program from the ROM 20B, and executes the program using the RAM 20C as a workspace.

The ROM 20B stores various programs and various data. A control program 100 that performs control of the ECU 20 including communication is stored on the ROM 20B in the present exemplary embodiment. An application program 110 for implementing an application using the ECU 20 is stored on the ROM 20B. The control program 100 is an example of a communication control program. The RAM 20C serves as a workspace to temporarily store programs or data.

The onboard communication I/F 20D is an interface for connecting to each of the ECUs 20. This interface employs a communication standard such as Ethernet (registered trademark). The onboard communication I/F 20D is connected to an external bus 20H (see FIG. 1).

The input-output I/F 20E is an interface for connecting the control unit 21 to other devices configuring the ECUs 20. For example, the Ethernet switch 30 is connected to the input-output I/F 20E of the central ECU 22.

The Ethernet switch 30 is a relay device that performs communication by Ethernet (registered trademark), and the Ethernet switch 30 of the present exemplary embodiment functions as an SDN switch. The Ethernet switch 30 performs communication with the ECU 20 based on communication information related to communication settings of the in-vehicle network 14. The Ethernet switch 30 is configured so as to be able to acquire the communication information from the control unit 21 or from other Ethernet switches 30. The Ethernet switch 30 is an example of a switching control unit.

The DCM 32 is a module that performs communication by a communication standard such as 5G, 4G, LTE, or the like. The DCM 32 is connected to a public network N (see FIG. 1). Note that the DCM 32 in the vehicle 12 is connected to the control unit 21 of the central ECU 22, however, there is no limitation thereto, and the DCM 32 may be inbuilt to the central ECU 22 or to the other ECU 24.

—Central ECU—

Figure 3:
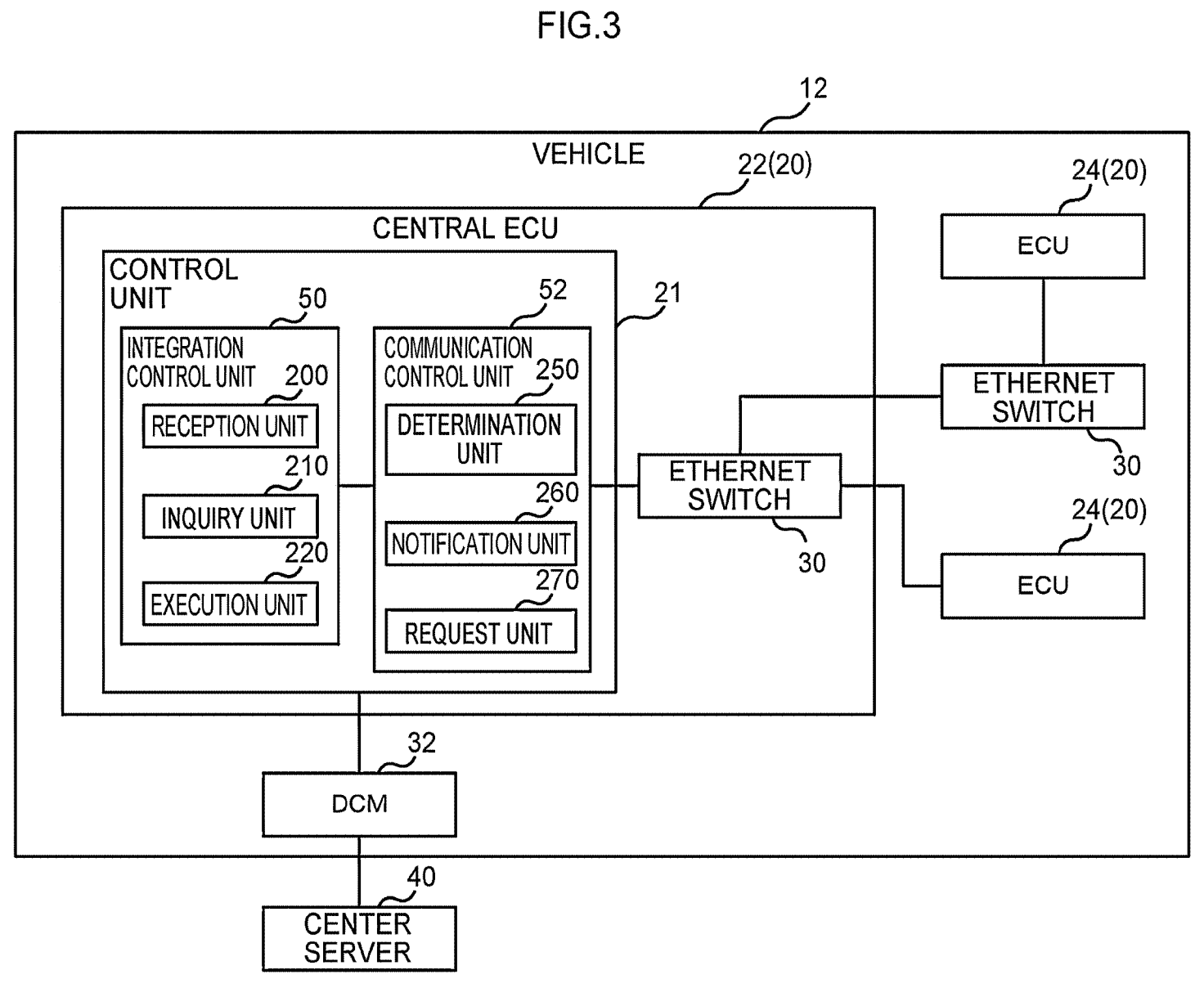

The central ECU 22 is an ECU 20 installed with the control unit 21 and the Ethernet switch 30. In the central ECU 22 of the present exemplary embodiment, the CPU 20A executes the control program 100, and functions as an integration control unit 50 and a communication control unit 52 illustrated in FIG. 3. The central ECU 22 is an example of a communication control device.

The integration control unit 50 downloads software such as the application program 110 during update, and controls execution of plug-and-play when a new ECU 20 has been connected to the in-vehicle network 14. The integration control unit 50 is configured including a reception unit 200, an inquiry unit 210, and an execution unit 220.

The reception unit 200 includes functions to receive detection of a download of the application program 110 and of plug-and-play of an ECU 20. The reception unit 200 of the present exemplary embodiment receives a change notification related to a change to the communication settings of the in-vehicle network 14.

The inquiry unit 210 includes a function to perform an inquiry to a user of the vehicle 12 as to whether or not to change the settings of the in-vehicle network 14.

The execution unit 220 serving as a reflection unit includes a function to perform execution of a settings change on the in-vehicle network 14 accompanying download of software or execution of plug-and-play. When software is being updated, the execution unit 220 of the present exemplary embodiment reflects setting information in the communication control unit 52 and the Ethernet switch 30 as triggered by download of the application program 110 being completed. When plug-and-play is executed, the execution unit 220 also reflects setting information in the communication control unit 52 and the Ethernet switch 30 as triggered by the vehicle 12 being restarted (namely, by the ignition switch being switched from OFF to ON).

The communication control unit 52 functions as an SDN controller. The communication control unit 52 is configured including a determination unit 250, a notification unit 260, and a request unit 270.

The determination unit 250 includes a function that, when software is downloaded or in plug-and-play, determines whether or not the communication control unit 52 and the Ethernet switch 30 hold appropriate settings information.

The notification unit 260 includes a function to notify the integration control unit 50 of states of the communication control unit 52 and the Ethernet switch 30. The notification unit 260 of the present exemplary embodiment transmits a diagnostic code to the integration control unit 50 when a malfunction has occurred in the in-vehicle network 14. The cause of malfunction can be ascertained by the center server 40 or the like that has acquired the diagnostic code through the integration control unit 50.

The request unit 270 includes a function to request appropriate settings information when the communication control unit 52 and the Ethernet switch 30 do not hold appropriate settings information. In such cases, the request unit 270 of the present exemplary embodiment requests settings information from the integration control unit 50 or the center server 40. The request unit 270 also requests operation verification of the Ethernet switches 30. Moreover, the request unit 270 requests activation of the Ethernet switches 30.

—Flow of Control—

Figure 4:
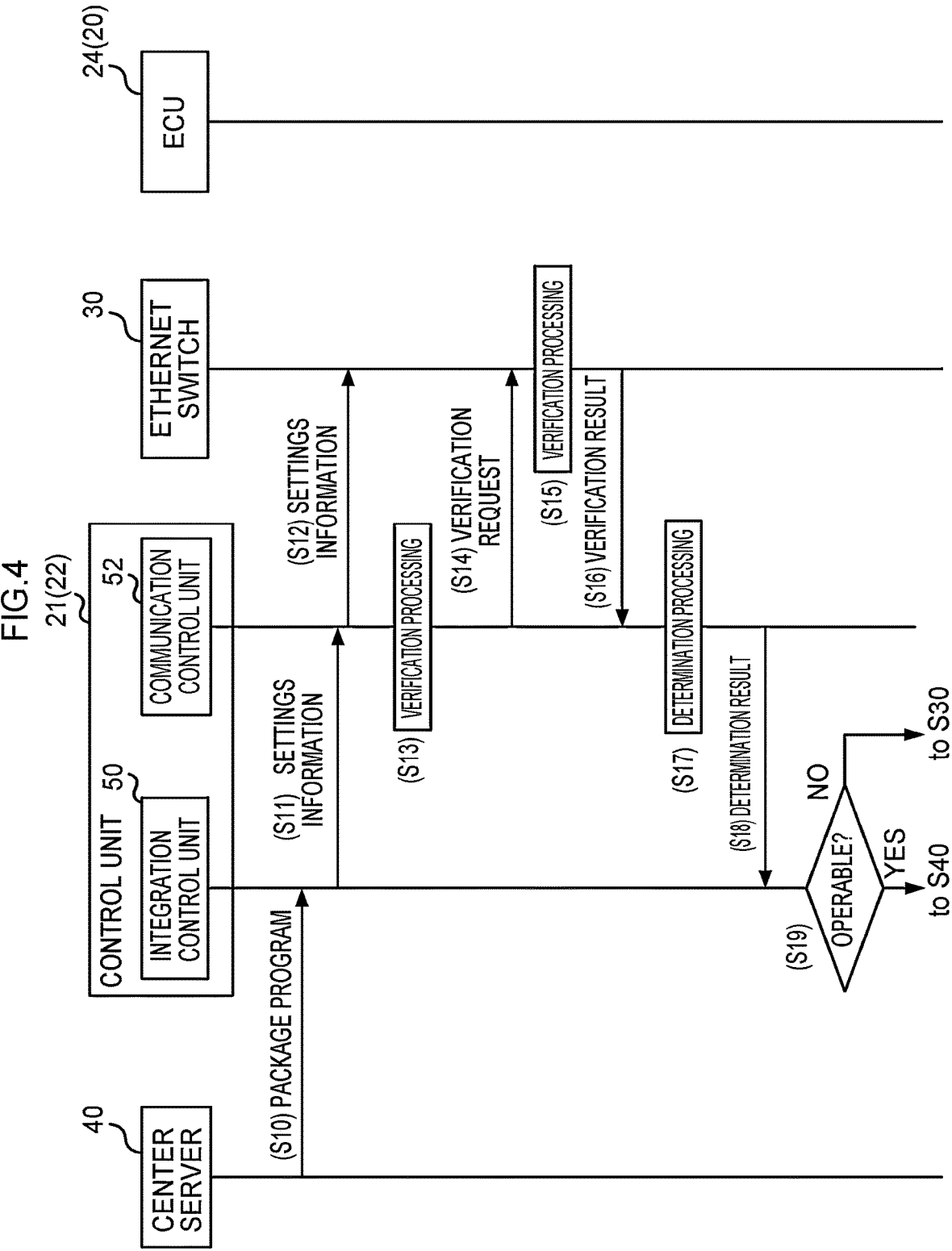
FIG. 4 is a sequence chart illustrating a flow of OTA processing in a communication control system of the first exemplary embodiment.
Figure 5:
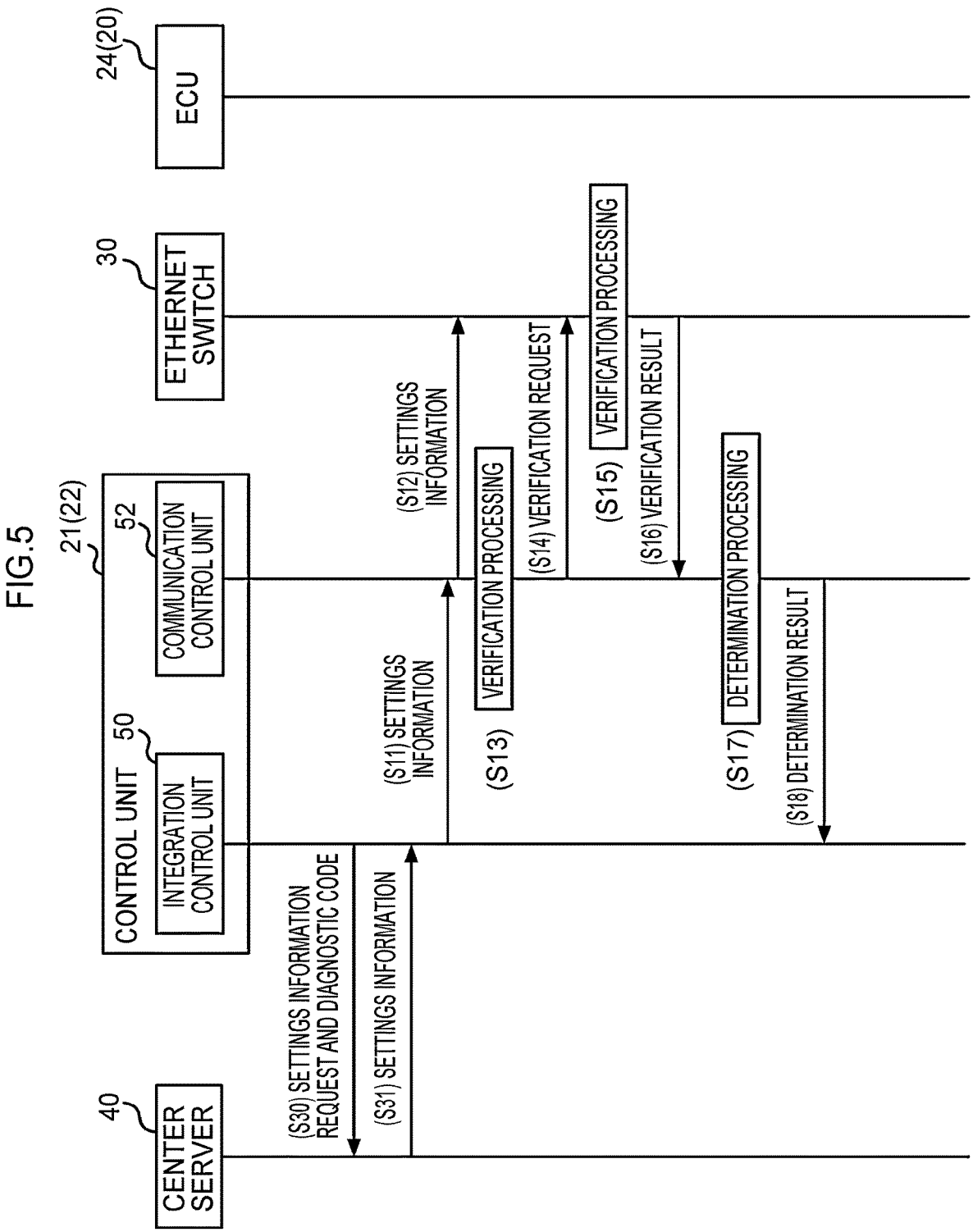
FIG. 5 is a sequence chart illustrating a flow of OTA processing in a communication control system of the first exemplary embodiment.
Figure 6:
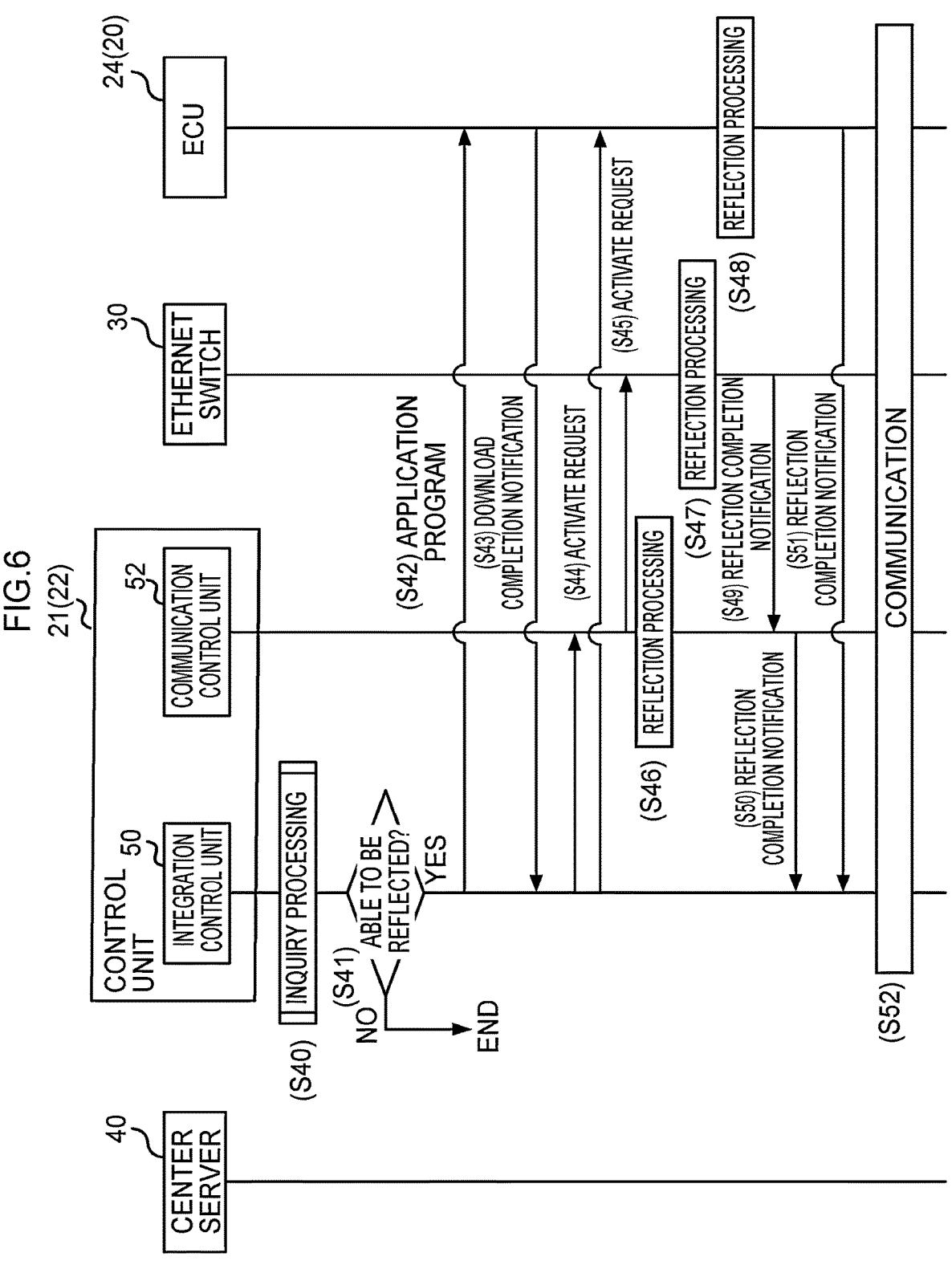
FIG. 6 is a sequence chart illustrating a flow of OTA processing in a communication control system of the first exemplary embodiment.
Figure 7:
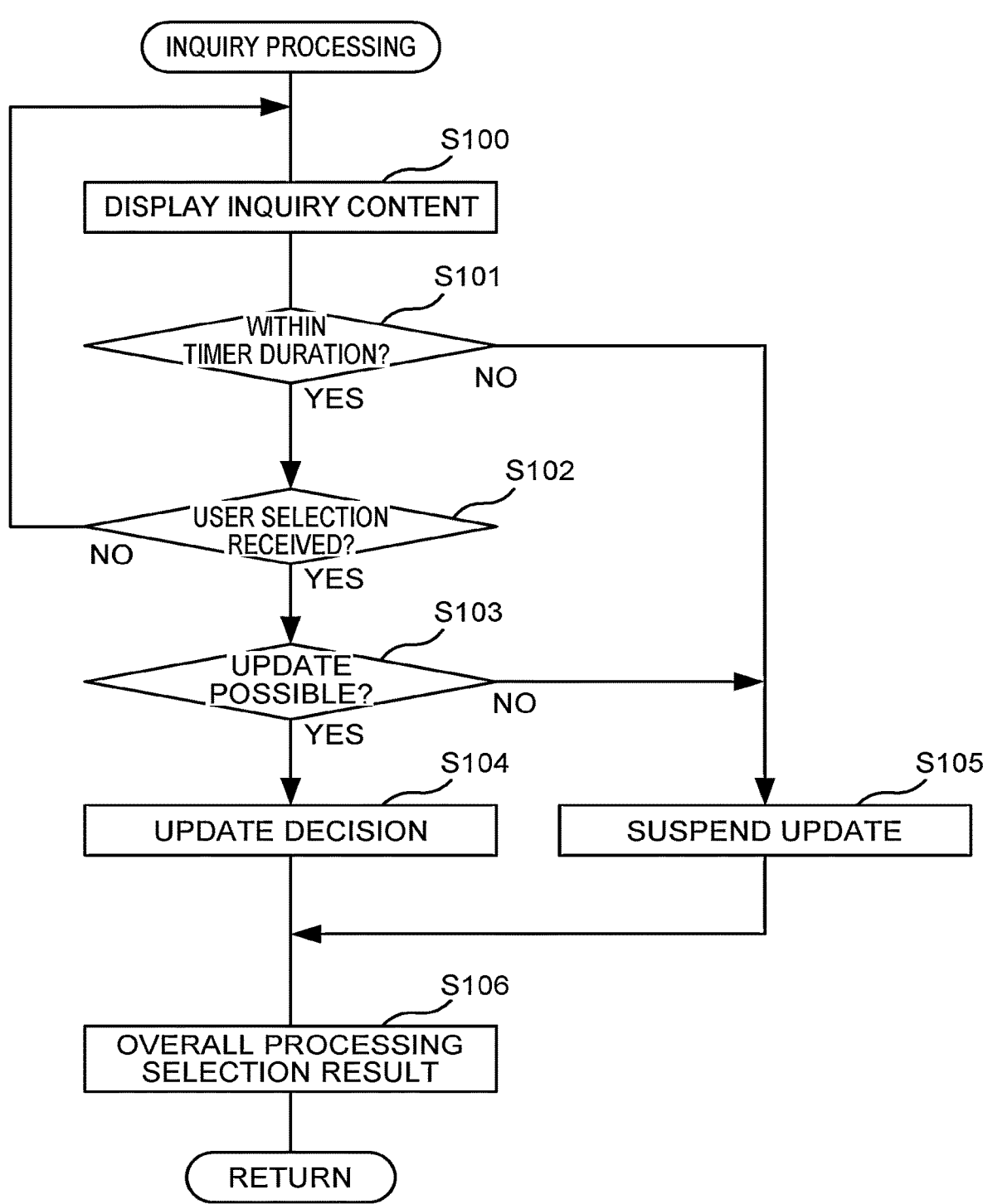
FIG. 7 is a flowchart illustrating a flow of inquiry processing executed in a central ECU of the first exemplary embodiment.
Figure 8:
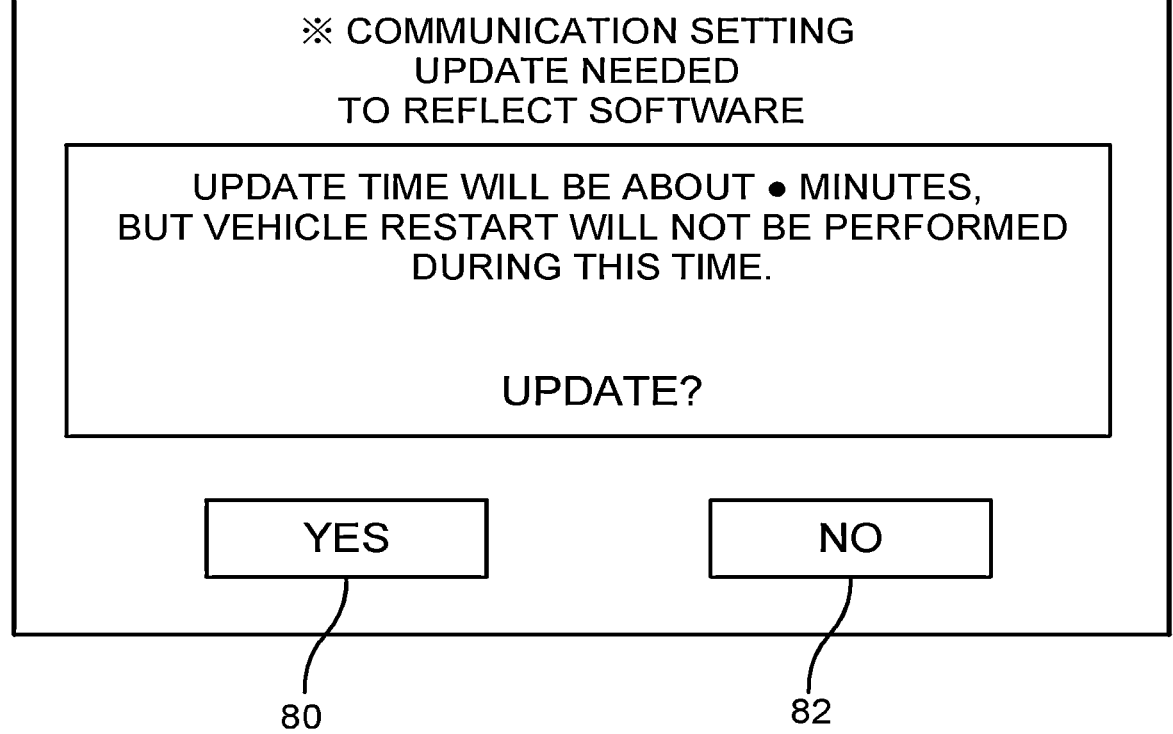
FIG. 8 is a face-on view illustrating an example of a display presented to a user in the first exemplary embodiment.
Figure 9:
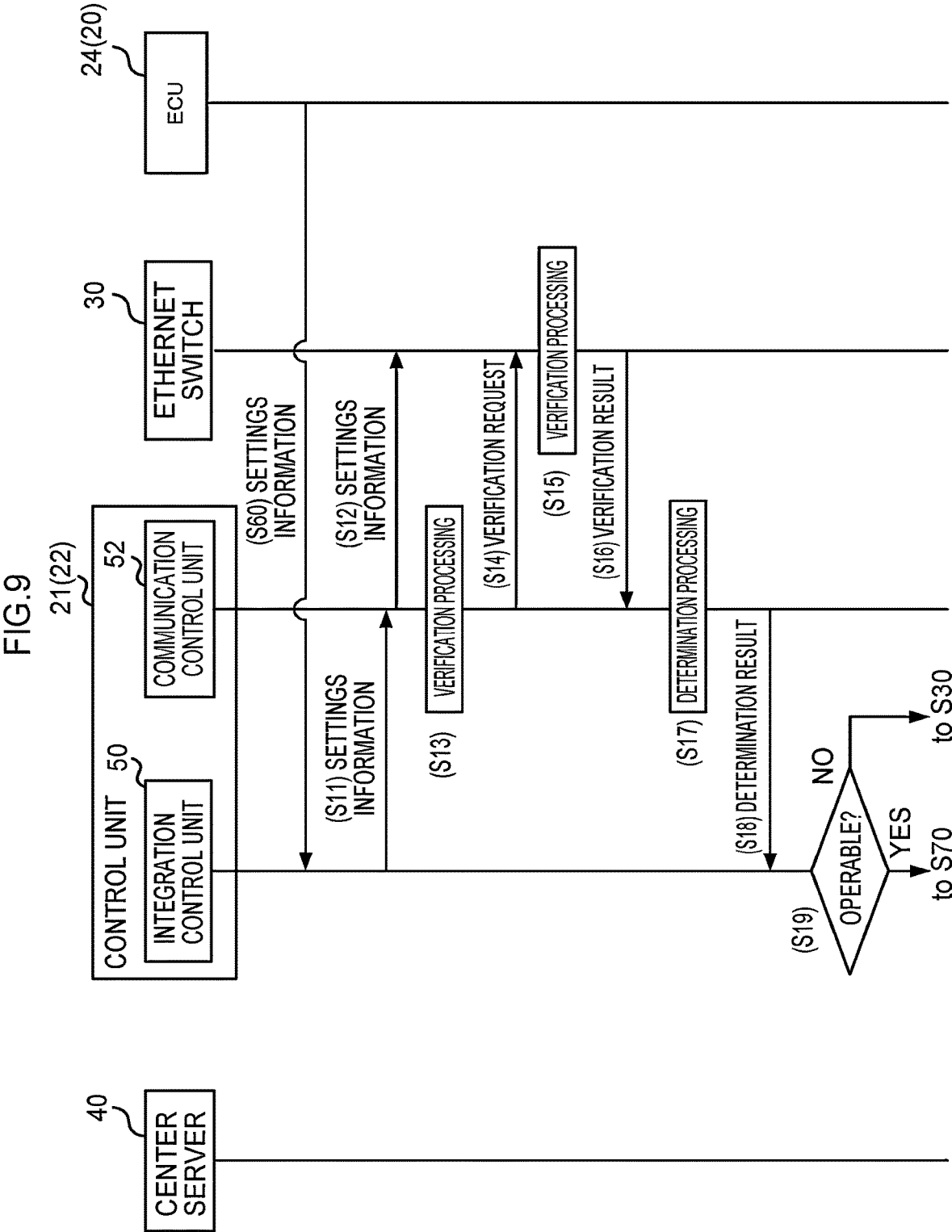
FIG. 9 is a sequence chart illustrating a flow of plug-and-play processing in a communication control system of the first exemplary embodiment.
Figure 10:
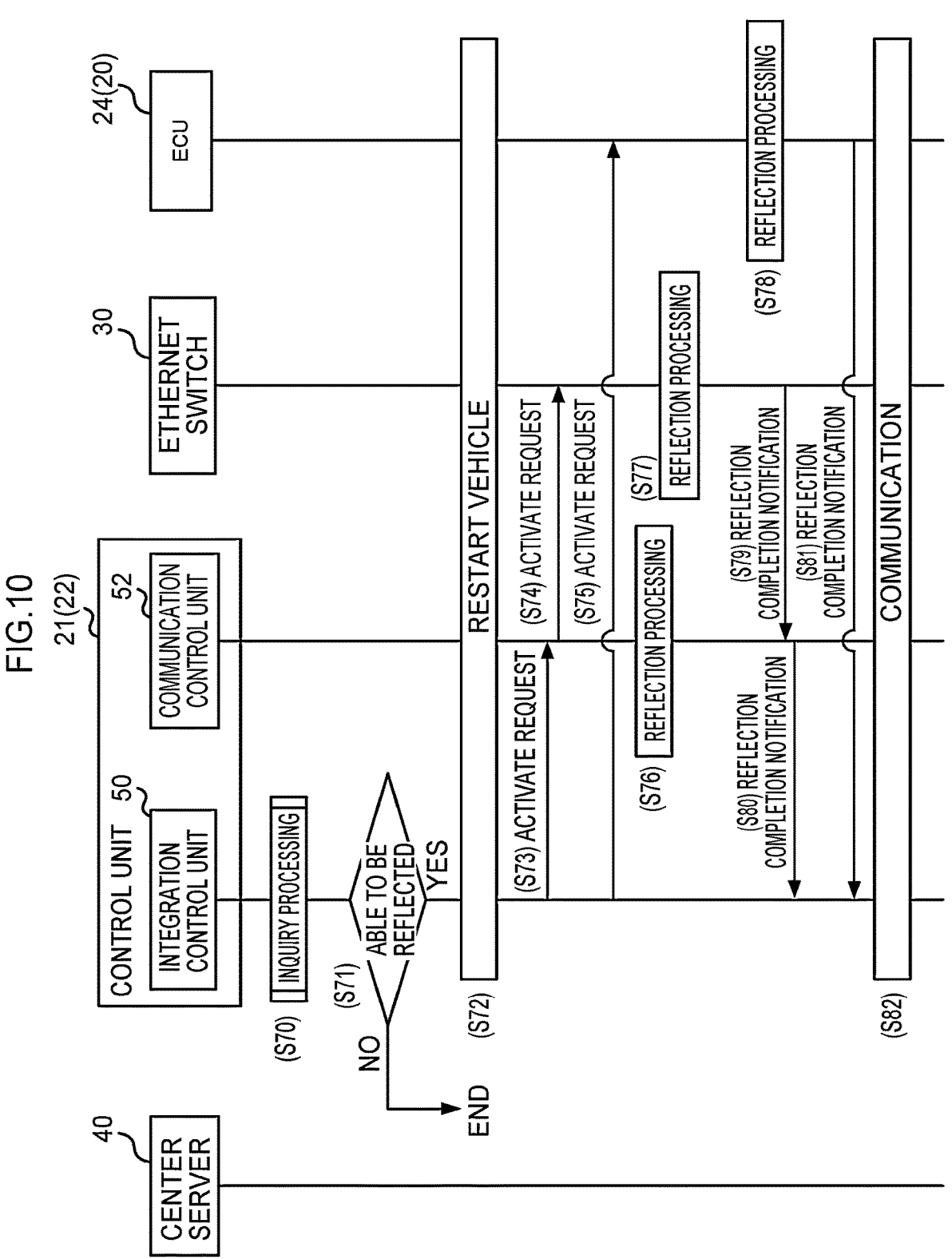
FIG. 10 is a sequence chart illustrating a flow of plug-and-play processing in a communication control system of the first exemplary embodiment.

Description follows regarding a flow of processing executed in the communication control system 10 of the present exemplary embodiment, with reference to the sequence charts of FIG. 4 to FIG. 6, the flowchart of FIG. 7, the display screen of FIG. 8, and the sequence chart of FIG. 9 and FIG. 10. The processing in the central ECU 22 is executed by the CPU 20A functioning as the integration control unit 50 and the communication control unit 52.

First, description follows regarding a flow of overall processing of the system including the center server 40, the control unit 21 of the central ECU 22, the Ethernet switch 30, and the ECU 24. Note that although in each of the sequence charts a single Ethernet switch 30 and a single ECU 24 are illustrated, there is no limitation thereto, and any Ethernet switches 30 and ECUs 24 on the in-vehicle network 14 are applicable.

At step S10 of FIG. 4, the center server 40 transmits a package program to the integration control unit 50 of the control unit 21. The package program includes the application program 110 and settings information of the in-vehicle network 14.

At step S11, the integration control unit 50 of the control unit 21 transmit settings information to the communication control unit 52.

At step S12, the communication control unit 52 of the control unit 21 transmits settings information to the Ethernet switch 30.

At step S13, the communication control unit 52 of the control unit 21 executes verification processing. Specifically, the communication control unit 52 of the control unit 21 verifies whether or not appropriate settings information is being stored. The appropriate settings information referred to here is settings information enabling the application program 110 downloaded at step S10 to be operated on the in-vehicle network 14.

At step S14, the communication control unit 52 of the control unit 21 performs a verification request to the Ethernet switch 30. Specifically, the communication control unit 52 requests the Ethernet switch 30 to transmit a verification result as to whether or not the Ethernet switch 30 is storing appropriate settings information.

At step S15 the Ethernet switch 30 executes verification processing. Specifically, the Ethernet switch 30 verifies whether or not appropriate settings information is stored.

At step S16, the Ethernet switch 30 transmits the verification result to the communication control unit 52 of the control unit 21. Specifically, the Ethernet switch 30 transmits a verification result as to whether or not the Ethernet switch 30 is stored with settings information to the communication control unit 52.

At step S17, the communication control unit 52 of the control unit 21 executes determination processing. Specifically, the communication control unit 52 performs determination as to whether or not the communication control unit 52 and the Ethernet switch 30 hold appropriate settings information.

At step S18, the communication control unit 52 of the control unit 21 transmits a determination result of the determination processing executed at step S17 to the integration control unit 50.

At step S19, the integration control unit 50 of the control unit 21 determines whether or not at least one of the communication control unit 52 or the Ethernet switch 30 is stored with appropriate settings information, namely whether or not the communication control unit 52 and the Ethernet switch 30 are operable according to the settings information. Processing transitions to step S40 when the integration control unit 50 has determined that the communication control unit 52 and the Ethernet switch 30 are operable (step S19: YES). However, processing transitions to step S30 when the integration control unit 50 has determined that the communication control unit 52 and the Ethernet switch 30 are inoperable (step S19: NO).

Next, description follows regarding an overall flow of processing of the system including the center server 40, the control unit 21, the Ethernet switch 30, and the ECU 24 for cases in which the integration control unit 50 of the control unit 21 has determined that the communication control unit 52 and the Ethernet switch 30 are inoperable.

At step S30 of FIG. 5, the integration control unit 50 of the control unit 21 request settings information from the center server 40 to make the Ethernet switch 30 operable. The integration control unit 50 generates a diagnostic code for inoperable and the cause of being inoperable in cases in which the communication control unit 52 and the Ethernet switch 30 has been determined to be inoperable at step S19. The integration control unit 50 then transmits the diagnostic code indicating that the ECU 20 and the Ethernet switch 30 are inoperable on the in-vehicle network 14 and the cause of being inoperable, together with a command requesting settings information.

At step S31, the center server 40 transmits settings information enabling the application program 110 to be operated on the in-vehicle network 14 to the integration control unit 50 of the control unit 21.

Then the center server 40, the control unit 21, the Ethernet switch 30, and the ECU 24 execute similar processing to the processing from step S11 to step S18 illustrated in FIG. 4.

Next, description follows regarding a flow of overall processing of a system including the center server 40, the control unit 21, the Ethernet switch 30, and the ECU 24 for cases in which the integration control unit 50 of the control unit 21 has determined that the communication control unit 52 and the Ethernet switch 30 are operable.

At step S40 of FIG. 6, the integration control unit 50 of the control unit 21 executes inquiry processing. Details regarding the inquiry processing are described later.

At step S41, the integration control unit 50 of the control unit 21 determines from the processing results of step S40 whether or not settings information is able to be reflected. The integration control unit 50 transitions to step S42 in cases in which determination is made that the settings information is able to be reflected (step S41: YES). However, the integration control unit 50 ends processing in cases in which determination is made that the settings information is not able to be reflected (step S41: NO).

At step S42, the integration control unit 50 of the control unit 21 transmits the application program 110 to the ECU 24 that is going to install the application program 110.

At step S43, the ECU 24 notifies the integration control unit 50 of the control unit 21 that download of the application program 110 has been completed.

At step S44, the integration control unit 50 of the control unit 21 requests the communication control unit 52 to activate. Specifically, the integration control unit 50 requests the settings information to be reflected in the communication control unit 52. Moreover, at step S44, the integration control unit 50 also requests the ECU 24 to activate.

At step S45, the communication control unit 52 of the control unit 21 requests the Ethernet switch 30 to activate.

Specifically, the communication control unit 52 requests the settings information to be reflected in the Ethernet switch 30.

At step S46, the communication control unit 52 of the control unit 21 executes reflection processing. Specifically, the communication control unit 52 reflects the settings information in the communication control unit 52.

At step S47, the Ethernet switch 30 executes reflection processing. Specifically, the Ethernet switch 30 reflects the settings information in the Ethernet switch 30.

At step S48, the ECU 24 executes reflection processing. Specifically, the ECU 24 reflects the installed application program 110 and the settings information.

At step S49, the Ethernet switch 30 notifies the communication control unit 52 of the control unit 21 that the settings information has been reflected in the Ethernet switch 30.

At step S50, the communication control unit 52 of the control unit 21 notifies the integration control unit 50 of the control unit 21 that the settings information has been reflected in the Ethernet switch 30 and the communication control unit 52.

At step S51, the ECU 24 notifies the integration control unit 50 of the control unit 21 that the application program 110 installed in the ECU 24 and the settings information have been reflected.

At step S52, the control unit 21, the Ethernet switch 30, and the ECU 24 start communication accompanying the execution of the application program 110 installed in the ECU 24.

Next, description follows regarding the inquiry processing of FIG. 7.

At step S100 of FIG. 7, the integration control unit 50 displays inquiry content on a monitor, such as an instrument panel, a meter panel, or the like provided in the vehicle 12. Specifically, as illustrated in FIG. 8, display is performed of there being a need to update communication settings in order to reflect software that is the application program 110, and that during update of the communication settings restart of the vehicle 12 is not going be performed for a given duration of time. A user of the vehicle 12 selects a button 80 displayed with "Yes" to execute reflection of software including update of communication settings. However, the user of the vehicle 12 selects a button 82 displayed with "No" to not execute reflection of software including update of communication settings.

At step S101, the integration control unit 50 determines whether or not it is still within a timer duration (for example, within a minute from the start of displaying the inquiry content). The integration control unit 50 transitions to step S102 in cases in which it is still within the timer duration (step S101: YES). However, the integration control unit 50 transitions to step S105 in cases in which the timer duration has elapsed (step S101: NO).

At step S102, the integration control unit 50 determines whether or not a selection as to whether or not to update the communication settings has been received. The integration control unit 50 transitions to step S103 in cases in which a selection as to whether or not to update the communication settings has been received (step S102: YES). However, the integration control unit 50 returns to step S100 in cases in which a selection as to whether or not to update the communication settings has not been received (step S102: NO).

At step S103, the integration control unit 50 determines whether or not a communication setting is updatable. Specifically, the integration control unit 50 determines whether or not the button 80 has been selected. The integration control unit 50 transitions to step S104 in cases in which the communication settings is updatable (step S103: YES). However, the integration control unit 50 transitions to step S105 in cases in which this communication setting information not updatable (step S103: NO).

At step S104, the integration control unit 50 decides to update the communication settings.

At step S105, the integration control unit 50 aborts update of the communication settings.

At step S106, the integration control unit 50 outputs the selection result of the user of the vehicle 12. Specifically, the integration control unit 50 outputs the user selection result as to whether or not to update the communication settings received when determined at step S102. The integration control unit 50 then ends the present inquiry processing, and returns to step S40 of FIG. 6.

Next, description follows regarding a flow of plug-and-play processing for when a new ECU 24 has been connected to the in-vehicle network 14, with reference to FIG. 9 and FIG. 10.

A flow of processing of the communication control system 10 illustrated in FIG. 4 and a flow of processing of the communication control system 10 illustrated in FIG. 9 differ in that processing of a step S60 is applied instead of the processing of step S10, and in that processing transitions to step S70 in cases in which affirmative determination is made at step S19. Note that the settings information to be verified during plug-and-play is settings information enabling the newly connected ECU 24 to be operated on the in-vehicle network 14.

The same step numbers to those of FIG. 4 are appended to steps executing the same processing to that of the flow of processing of the communication control system 10 illustrated in FIG. 4, and explanation thereof will be omitted.

At step S60 of FIG. 9, the ECU 24 transmits settings information to the integration control unit 50 of the control unit 21.

Next, description follows regarding a flow of overall processing of a system including the center server 40, the control unit 21, the Ethernet switch 30, and the ECU 24 for cases in which affirmative determination is made at step S19.

At step S70 of FIG. 10, the integration control unit 50 of the control unit 21 executes inquiry processing. The flow of inquiry processing is the same as the flow of processing illustrated in FIG. 7.

At step S71, the integration control unit 50 of the control unit 21 determines whether or not the settings information is able to be reflected from the processing results of step S70. The integration control unit 50 transitions to step S72 in cases in which the settings information has been determined to be able to be reflected (step S71: YES). On the other hand, the integration control unit 50 ends processing in cases in which the settings information has been determined not able to be reflected (step S71: NO).

The vehicle 12 is restarted at step S72. Specifically, the vehicle 12 is controlled such that the ignition is first turned OFF, and then turned ON again.

At step S73, the integration control unit 50 of the control unit 21 requests the communication control unit 52 to activate. Specifically, the integration control unit 50 requests the settings information be reflected in the communication control unit 52.

At step S74, the communication control unit 52 of the control unit 21 requests the Ethernet switch 30 to activate. Specifically, the communication control unit 52 request the settings information be reflected in the Ethernet switch 30.

At step S75, the integration control unit 50 of the control unit 21 requests the ECU 24 to activate. Specifically, the integration control unit 50 request that the settings information be reflected in the ECU 24.

At step S76, the communication control unit 52 of the control unit 21 executes reflection processing. Specifically, the communication control unit 52 reflects the settings information in the communication control unit 52.

At step S77, the Ethernet switch 30 executes reflection processing. Specifically, the Ethernet switch 30 reflects the settings information in the Ethernet switch 30.

At step S78, the ECU 24 executes reflection processing. Specifically, the ECU 24 reflects the settings information in the ECU 24.

At step S79, the Ethernet switch 30 notifies the communication control unit 52 of the control unit 21 that the settings information has been reflected in the Ethernet switch 30.

At step S80, the communication control unit 52 of the control unit 21 notifies the integration control unit 50 of the control unit 21 that the settings information has been reflected in the Ethernet switch 30 and the communication control unit 52.

At step S81, the ECU 24 notifies the integration control unit 50 of the control unit 21 that the settings information has been reflected in the ECU 24.

At step S82, the control unit 21, the Ethernet switch 30, and the ECU 24 start communication.

—Overview—

In the central ECU 22 of the present exemplary embodiment, in cases in which determination has been made that the Ethernet switch 30 is inoperable according to the settings information, the communication control unit 52 notifies the user of the vehicle 12 that the Ethernet switch 30 is inoperable according to the settings information, and notifies a diagnostic code. This means that a user is able to ascertain that the Ethernet switch 30 is inoperable according to the settings information and the cause of being inoperable.

Moreover, in the central ECU 22 of the present exemplary embodiment, the communication control unit 52 requests the center server 40 for settings information to make the Ethernet switch 30 operable in cases in which the Ethernet switch 30 has been determined inoperable according to the settings information. This means that even though the Ethernet switch 30 is inoperable according to the settings information, settings information that make the Ethernet switch 30 operable can still be acquired.

Moreover, in the central ECU 22 of the present exemplary embodiment, the integration control unit 50 receives change notification accompanying update of the application program 110 executed in a control device ECU 24 on the in-vehicle network. This means that a change notification can be received accompanying update of the application program 110.

Moreover, in the central ECU 22 of the present exemplary embodiment, the integration control unit 50 receives change notification in cases in which a new ECU 24 has been connected. This thereby enables change notification to be received in cases in which a new ECU 24 has been connected.

The change notification of the present exemplary embodiment is notification related to update of the application program 110, and the communication control unit 52 determines whether or not settings information based on the updated application program 110 is stored in the central ECU 22. This thereby enables determination as to whether or not settings information is stored based on information of the application program 110.

Moreover, in the central ECU 22 of the present exemplary embodiment, the integration control unit 50 receives change notification from the center server 40. This thereby enables change notification to be received from a device outside the in-vehicle network 14.

Moreover, in cases in which the communication settings of the in-vehicle network 14 are to be changed, the central ECU 22 of the present exemplary embodiment reflects new settings information in the communication control unit 52 and the Ethernet switch 30 at a specific trigger after change notification related to change of communication settings has been received. This means that in the present exemplary embodiment, communication trouble when network settings are changed is suppressed due to the communication settings of the communication control unit 52 and the Ethernet switch 30 in the in-vehicle network 14 being reflected at the specific trigger.

In particular, in the present exemplary embodiment, communication trouble is suppressed in cases in which the communication settings are changed when software is downloaded by OTA. Moreover, in the present exemplary embodiment, communication trouble is suppressed in cases in which communication settings are changed when plug-and-play is executed accompanying connection of a new ECU 24.

The vehicle 12 of the present exemplary embodiment includes the central ECU 22, and at least one Ethernet switch 30, and an ECU 24. The vehicle 12 of the present exemplary embodiment, in cases in which communication settings of a network have been changed in a user-unaware state, enables a situation in which a switching control unit is unable to operate according to the new network settings to be ex post facto suppressed from being actualized, and enables safe vehicle travel to be secured.

Second Exemplary Embodiment

A second exemplary embodiment differs from the first exemplary embodiment in that the Ethernet switch 30 is configured as a separate body to the central ECU 22. Description follows regarding points of difference to the first exemplary embodiment.

Figure 11:
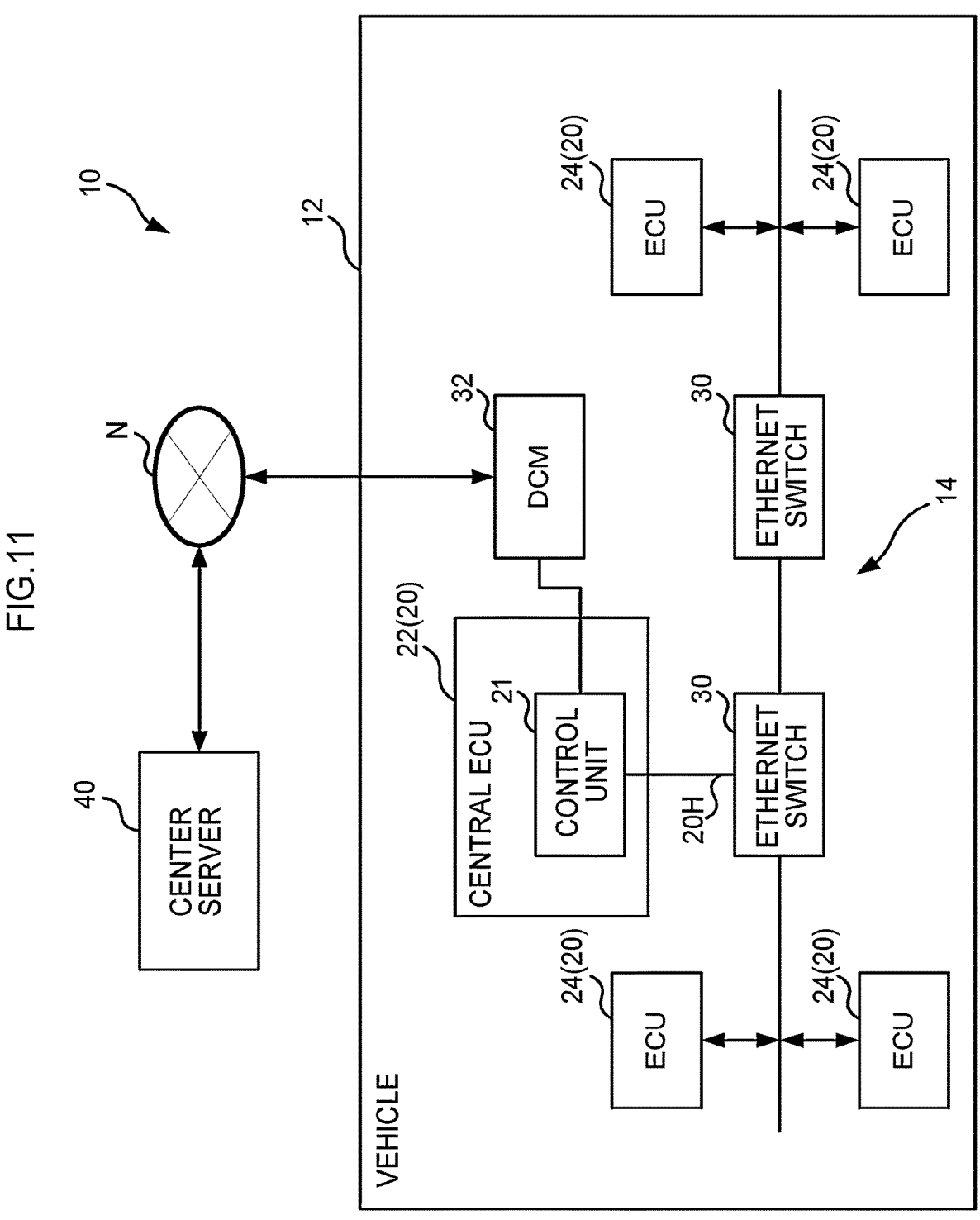
FIG. 11 is block diagram illustrating a hardware structure of an ECU in a vehicle of a second exemplary embodiment.

As illustrated in FIG. 11, the central ECU 22 is configured including the control unit 21 alone, and does not include a Ethernet switch 30. Namely, the Ethernet switch 30 is configured as a separate body to the central ECU 22.

As described above, the present exemplary embodiment is configured with the Ethernet switch 30 as a separate body to the central ECU 22. This means that even in cases in which the central ECU 22 does not include the Ethernet switch 30, the present exemplary embodiment, in cases in which communication settings of the in-vehicle network 14 have been changed in a user-unaware state, enables a situation in which the Ethernet switch 30 is unable to operate according to the new network settings to be ex post facto suppressed from being actualized.

Third Exemplary Embodiment

A third exemplary embodiment differs from the first exemplary embodiment in that the integration control unit 50 of the control unit 21 is caused to function by an ECU 20 separate to the central ECU 22. Description follows regarding points of difference to the first exemplary embodiment.

Figure 12:
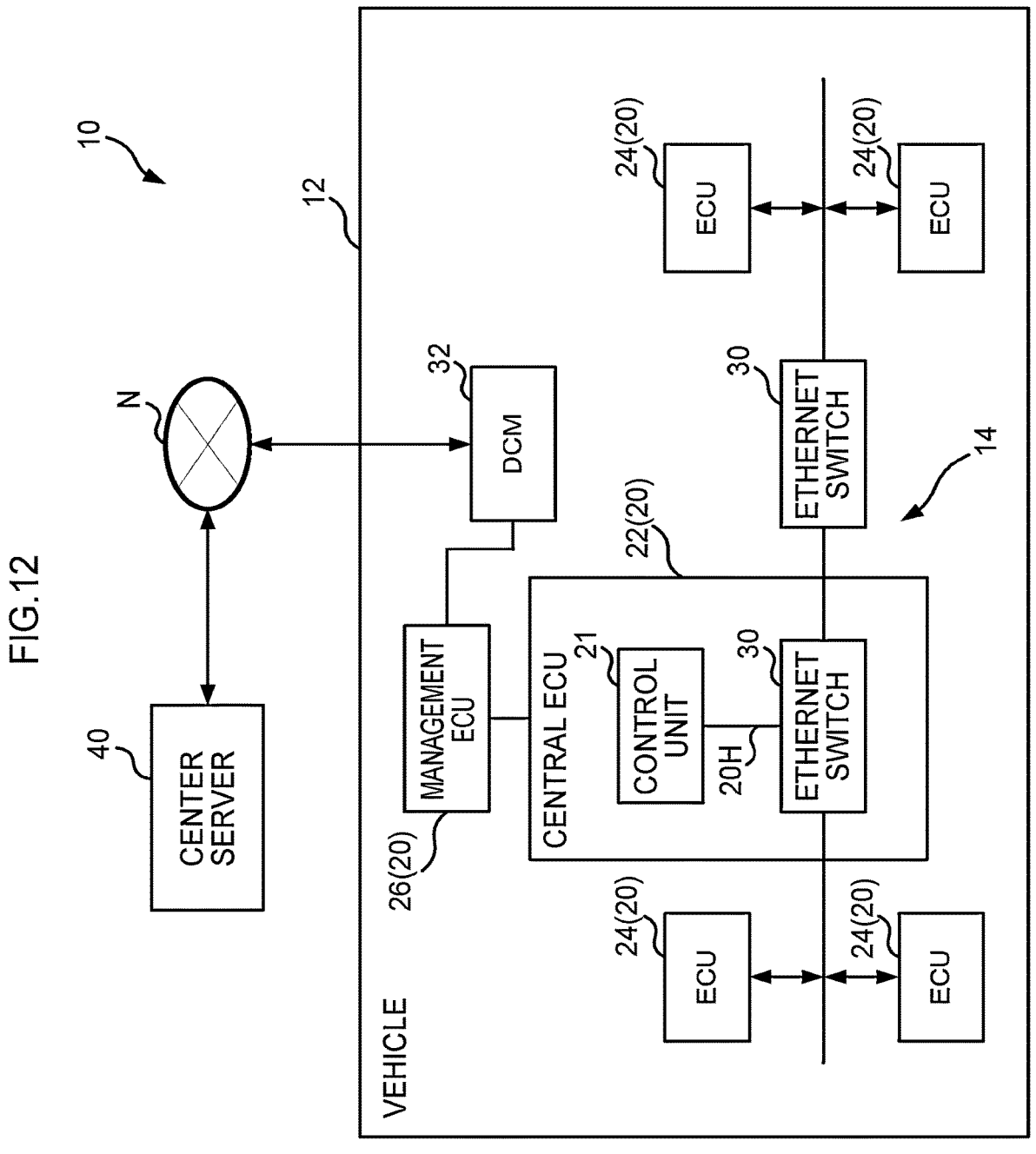
FIG. 12 is a block diagram illustrating a hardware structure of an ECU in a vehicle of a third exemplary embodiment.

As illustrated in FIG. 12, in the vehicle 12 of the present exemplary embodiment, an in-vehicle network 14 is configured including plural ECUs 20, plural Ethernet switches 30, and a DCM 32. The ECUs 20 include a central ECU 22, an ECU 24, and a management ECU 26. The DCM 32 is connected to a public network N through the management ECU 26.

Figure 13:
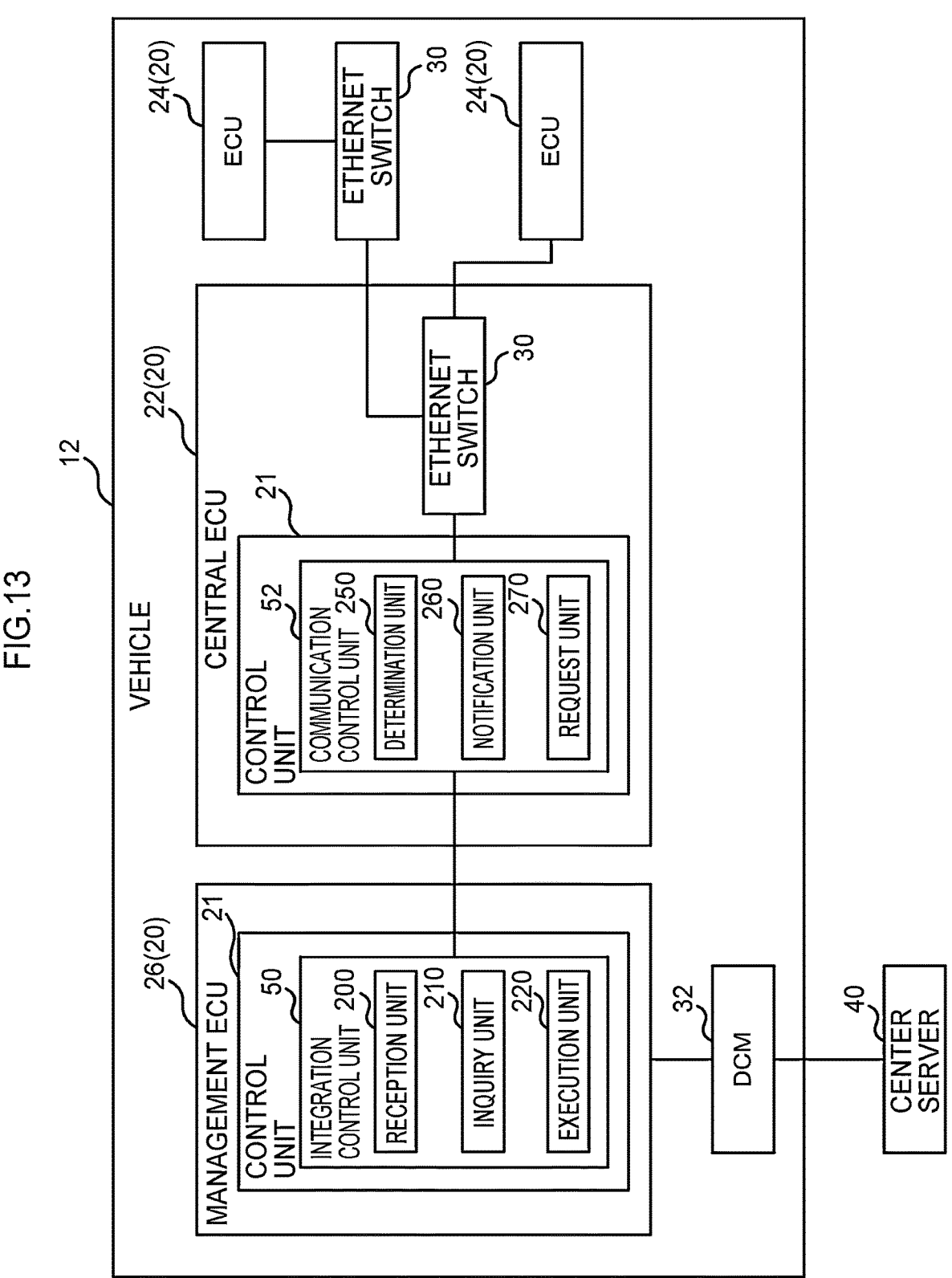
FIG. 13 is a block diagram illustrating a functional structure of a communication control system of the third exemplary embodiment.

The central ECU 22 functions as a communication control unit 52 illustrated in FIG. 13 by a CPU 20A therein executing a control program 100. On the other hand, the management ECU 26 functions as an integration control unit 50 illustrated in FIG. 13 by a CPU 20A therein executing the control program 100. Namely, in the vehicle 12 of the present exemplary embodiment, processing related to changing network settings of the communication control unit 52 and the integration control unit 50 is implemented by plural CPUs 20A.

In the present exemplary embodiment, the integration control unit 50 of the control unit 21 is caused to function by an ECU 20 separate to the central ECU 22. This means that even in cases in which the integration control unit 50 of the control unit 21 functions due to an ECU 20 separate to the central ECU 22, the present exemplary embodiment, in cases in which communication settings of the in-vehicle network 14 have been changed in a user-unaware state, enables a situation in which the Ethernet switch 30 is unable to operate according to the new network settings to be ex post facto suppressed from being actualized.

REMARKS

Note that processing related to changing network settings in each of the above exemplary embodiments has been illustrated by examples of processing when the application program 110 that is software has been downloaded, and of processing when plug-and-play is executed when an ECU 24 has been added to the in-vehicle network 14. However, the processing related to changing network settings of the present exemplary embodiment is not limited in application to such cases, and may be applied to cases in which a structure of the in-vehicle network 14 is built when manufacturing the vehicle 12, or may be applied to cases in which the in-vehicle network 14 has been subjected to an external attack and adopted a failsafe state.

The various processing executed by the CPU 20A reading software (programs) in the above exemplary embodiments may be executed by various processors other than a CPU. Examples of such processors include programmable logic devices (PLD) that allow circuit structure to be modified post-manufacture, such as a field-programmable gate array (FPGA), and dedicated electric circuits, these being processors including a circuit structure custom-designed to execute specific processing, such as an application specific integrated circuit (ASIC). Moreover, each of the above processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, in the above exemplary embodiment a mode has been described in which each program is pre-stored (installed) on a computer-readable non-transitory recording medium. For example, the control program 100 is pre-stored on the ROM 20B of the ECU 20. However, there is no limitation thereto, and each program may be provided in a format recorded on a non-transitory recording medium such as a compact disc read only memory (CD-ROM), digital versatile disc read only memory (DVD-ROM), universal serial bus (USB) memory, or the like. Moreover, the programs may be provided in a format downloadable from an external device over a network.

The flows of processing described for the above exemplary embodiments are merely an examples thereof, and redundant steps may be omitted, new steps may be added, and the processing sequence may be swapped around within a range not departing from the spirit.

—Additional Note 1—

A communication control device that includes a processor and controls communication of a network, the communication control device being configured such that the processor:

receives a change notification related to a change in a communication setting of the network;

determines whether or not a switching control unit connected to the communication control device is operable according to new settings information of the network needed to accompany the change notification; and prompts a user to indicate whether or not to reflect the new settings information in the switching control unit in cases in which the switching control unit has been determined to be operable according to the settings information.

—Additional Note 2—

The communication control device of Supplement 1, wherein the processor further, in cases in which the switching control unit has been determined to be inoperable according to the new settings information, notifies the user both that the switching control unit is inoperable according to the new settings information and of a cause of being inoperable.

—Additional Note 3—

The communication control device of Supplement 1 or Supplement 2, wherein the processor further, in cases in which the switching control unit has been determined to be inoperable according to the settings information, requests settings information that would make the switching control unit operable from an external device external to the network.

—Additional Note 4—

The communication control device of any one of Supplement 1 to Supplement 3 wherein the processor receives the change notification together with an update of software for execution in a control device on the network.

—Additional Note 5—

The communication control device of any one of Supplement 1 to Supplement 4 wherein the processor receives the change notification in cases in which a new control device has been connected to the network.

—Additional Note 6—

The communication control device of any one of Supplement 1 to Supplement 3 wherein the processor receives the change notification in cases in which the network has been subjected to an external attack and a failsafe state has been adopted.

The entire content of the disclosure of Japanese Patent Application No. 2022-008999 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

What is claimed is:

1. A communication control device that controls communication of a network, the communication control device comprising:
   a memory; and
   a processor coupled to the memory, the processor configured to:
      receive a change notification related to a change in a communication setting of the network;
      determine whether or not a switching control unit connected to the communication control device is operable according to new settings information of the network needed to accompany the change notification; and
      prompt a user to indicate whether or not to reflect the new settings information in the switching control unit in cases in which the switching control unit has been determined to be operable according to the settings information.

2. The communication control device of claim 1, wherein in cases in which the processor has determined that the switching control unit is inoperable according to the new settings information, the processor is further configured to notify the user both that the switching control unit is inoperable according to the new settings information and of a cause of being inoperable.

3. The communication control device of claim 1, wherein in cases in which the processor has determined that the switching control unit is inoperable according to the settings information, the processor is further configured to request settings information that would make the switching control unit operable from an external device external to the network.

4. The communication control device of claim 1, wherein the processor is further configured to receive the change notification together with an update of software for execution in a control device on the network.

5. The communication control device of claim 1, wherein the processor is further configured to receive the change notification in cases in which a new control device has been connected to the network.

6. The communication control device of claim 1, wherein the processor is further configured to receive the change notification in cases in which the network has been subjected to an external attack and a failsafe state has been adopted.

7. A vehicle comprising:
   the communication control device of claim 1;
   at least one switching control unit; and
   a control device connected to the switching control unit.

8. A communication control method that controls communication of a network, executed by a processor, the communication control method comprising:
   receiving a change notification related to a change in a communication setting of the network;
   determining whether or not a switching control unit connected to a communication control device is operable according to new settings information of the network needed to accompany the change notification; and
   prompting a user to indicate whether or not to reflect the new settings information in the switching control unit in cases in which the switching control unit has been determined to be operable according to the settings information.

9. A non-transitory storage medium storing a program that controls communication of a network, executable by a processor to perform communication control processing, the communication control processing comprising:
   receiving a change notification related to a change in a communication setting of the network;
   determining whether or not a switching control unit connected to a communication control device is operable according to new settings information of the network needed to accompany the change notification; and
   prompting a user to indicate whether or not to reflect the new settings information in the switching control unit in cases in which the switching control unit has been determined to be operable according to the settings information.

* * * * *